United States Patent
Ikeda

(10) Patent No.: US 11,514,163 B2
(45) Date of Patent: Nov. 29, 2022

(54) TERMINAL DEVICE, METHOD FOR CONTROL OF REPORT OF OPERATION INFORMATION PERFORMED BY TERMINAL DEVICE, AND RECORDING MEDIUM STORING THEREIN PROGRAM FOR CONTROL OF REPORT OF OPERATION INFORMATION PERFORMED BY TERMINAL DEVICE

(71) Applicant: NEC CORPORATION, Tokyo (JP)

(72) Inventor: Satoshi Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 365 days.

(21) Appl. No.: 16/640,582

(22) PCT Filed: Sep. 6, 2017

(86) PCT No.: PCT/JP2017/032134
§ 371 (c)(1),
(2) Date: Feb. 20, 2020

(87) PCT Pub. No.: WO2019/049243
PCT Pub. Date: Mar. 14, 2019

(65) Prior Publication Data
US 2020/0201996 A1    Jun. 25, 2020

(51) Int. Cl.
*G06F 21/56* (2013.01)
*G06F 16/2455* (2019.01)
(Continued)

(52) U.S. Cl.
CPC ...... *G06F 21/566* (2013.01); *G06F 16/24564* (2019.01); *G06F 17/18* (2013.01);
(Continued)

(58) Field of Classification Search
CPC ........ G06F 21/50; G06F 21/55; G06F 21/554; G06F 21/56; G06F 21/566; G06F 21/567; G06F 21/577
See application file for complete search history.

(56) References Cited

U.S. PATENT DOCUMENTS

| 2007/0143552 A1* | 6/2007 | Rastogi | H04L 63/1458 |
| | | | 711/154 |
| 2009/0113246 A1 | 4/2009 | Sabato et al. | |
| 2017/0099311 A1* | 4/2017 | Kesin | H04L 63/1425 |

FOREIGN PATENT DOCUMENTS

| WO | 03/081433 A1 | 10/2003 |
| WO | 2013/105128 A1 | 7/2013 |
| WO | 2014/157240 A1 | 10/2014 |

OTHER PUBLICATIONS

International Search Report dated Dec. 5, 2017, issued by the International Searching Authority in counterpart in International App. No. PCT/JP2017/032134 (PCT/ISA/210).

(Continued)

*Primary Examiner* — Edward Zee
(74) *Attorney, Agent, or Firm* — Sughrue Mion, PLLC

(57) ABSTRACT

A terminal device includes an abstraction unit for generating abstracted operation information acquired by abstracting operation information indicating a result of operation of an own device, based on an abstraction rule; a computation unit for computing, based on the abstracted operation information, a forecast score indicating a level of forecast possibility relating to the operation information; and a determination unit for determining, based on the forecast score, whether to transmit the operation information to a detection device for detecting that the own device operates in an illicit manner, and thus retains that the detection device securely captures an illicit operation by the terminal device, and efficiently (Continued)

reduces the operation information being transmitted from the terminal device to the detection device.

14 Claims, 9 Drawing Sheets

(51) Int. Cl.
    *G06F 17/18*     (2006.01)
    *G06F 21/44*     (2013.01)
    *G06F 21/55*     (2013.01)
    *G06F 21/57*     (2013.01)
    *H04L 9/06*     (2006.01)
    *G06F 21/00*     (2013.01)

(52) U.S. Cl.
    CPC ............ *G06F 21/44* (2013.01); *G06F 21/554* (2013.01); *G06F 21/577* (2013.01); *H04L 9/0643* (2013.01)

(56) References Cited

OTHER PUBLICATIONS

Translation of Written opinion dated Dec. 5, 2017, issued by the International Searching Authority in counterpart in International App. No. PCT/JP2017/032134 (PCT/ISA/237).

\* cited by examiner

Fig. 2

| ORDER OF OPERATION | OPERATION INFORMATION 150 |
|---|---|
| 1 | type:process, mode:start, path:\temp\abcde.exe, pid:1234 |
| 2 | type:registry, mode:set-value, key:HKCU\software\key1, value:1, pid:1234 |
| 3 | type:registry, mode:set-value, key:HKCU\software\key2, value:2, pid:1234 |
| 4 | type:file, mode:read, path:\program files\A\B\C.dat, pid:1234 |
| 5 | type:network, mode:dns, host:example.com, ip:192.168.0.1, pid:1234 |
| 6 | type:network, mode:http, host:example.com, headers:..., pid:1234 |
| 7 | type:file mode:remove, path:\program files\A\B\temp.dat, pid:1234 |
| 8 | type:file, mode:write, path:\program files\A\B\C.dat, pid:1234 |
| 9 | type:process, mode:stop, path:\temp\abcde.exe, pid:1234 |
| ... | ... |

Fig. 3

140 ABSTRACTION RULE

| TYPE (type) | ABSTRACTION RULE WITH RESPECT TO OPERATION INFORMATION 150 |
|---|---|
| process | • retain type, mode<br>• abstract path until depth "1" |
| registry | • retain type, mode<br>• abstract key until depth "2" |
| file | • retain type, mode<br>• abstract path until following depth according to mode<br>  —when mode is write, "3"<br>  —when mode is read, "2"<br>  —when mode is remove, "3"<br>• abstract extension included in path, as item ext<br>  (when mode is write or remove) |
| network | • retain type, mode |

Fig. 4

| ORDER OF OPERATION | ABSTRACTED OPERATION INFORMATION 110 |
|---|---|
| 1 | type:process, mode:start, path:¥temp |
| 2 | type:registry, mode:set-value, key:HKCU¥software |
| 3 | type:registry, mode:set-value, key:HKCU¥software |
| 4 | type:file, mode:read, path:¥program files¥A |
| 5 | type:network, mode:dns |
| 6 | type:network, mode:http |
| 7 | type:file mode:remove, path:¥program files¥A¥B, ext=dat |
| 8 | type:file, mode:write, path:¥program files¥A¥B, ext=dat |
| 9 | type:process, mode:stop, path:¥temp |
| ... | ... |

Fig. 5

↙ 141 HISTORY INFORMATION

| TYPE OF OPERATION | CONTENT OF ABSTRACTED OPERATION | NUMBER OF TIMES OF OCCURRENCE (FREQUENCY OF OCCURRENCE) |
|---|---|---|
| 1 | type:process, mode:start, path:¥temp | 5 |
| 2 | type:process, mode:stop, path:¥temp | 5 |
| 3 | type:registry, mode:set-value, key:HKCU¥software | 3 |
| 4 | type:file, mode:read, path:¥program files¥A | 100 |
| 5 | type:file, mode:write, path:¥program files¥A¥B, ext=dat | 15 |
| 6 | type:file mode:remove, path:¥program files¥A¥B, ext=dat | 4 |
| 7 | type:network, mode:dns | 10 |
| 8 | type:network, mode:http | 20 |
| ... | ... | ... |

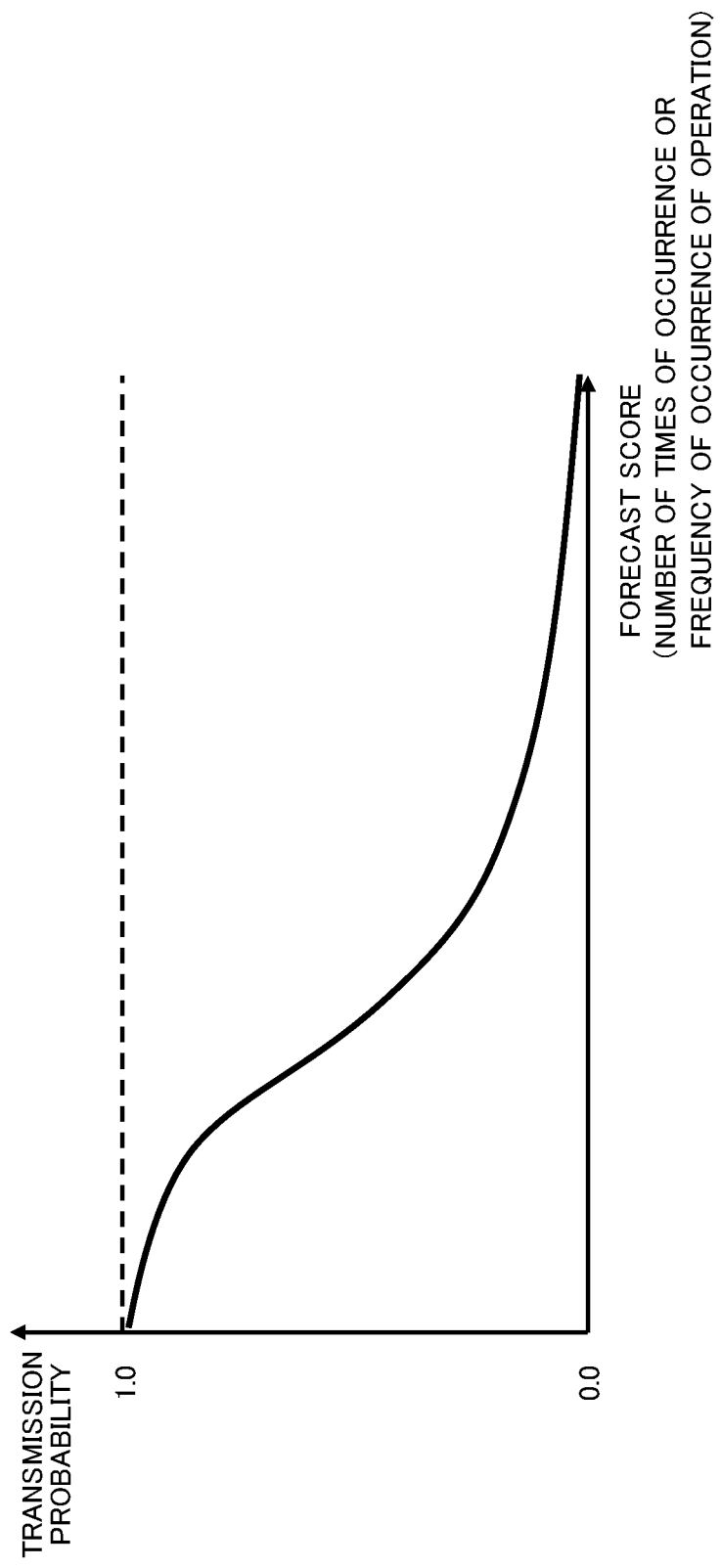

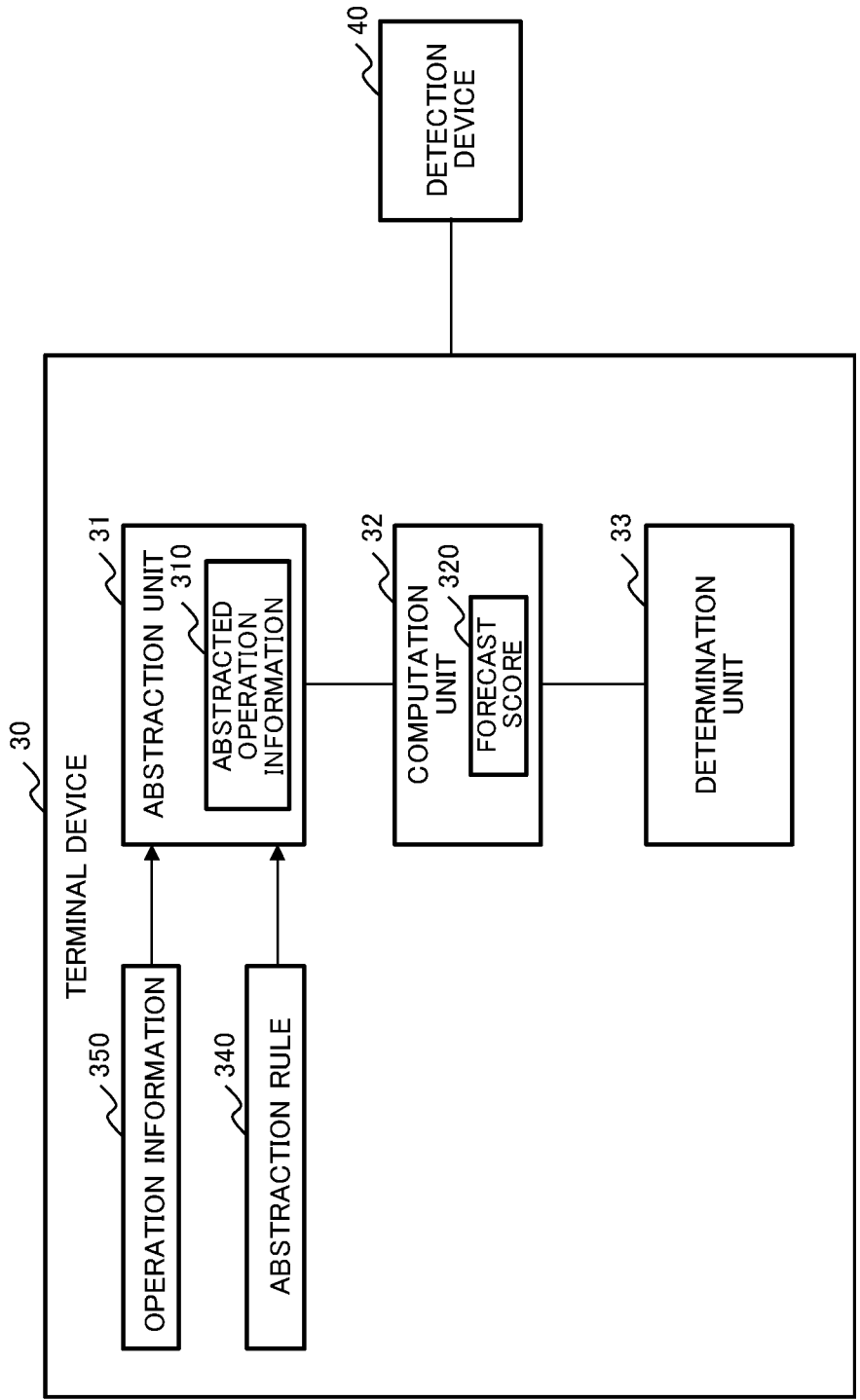

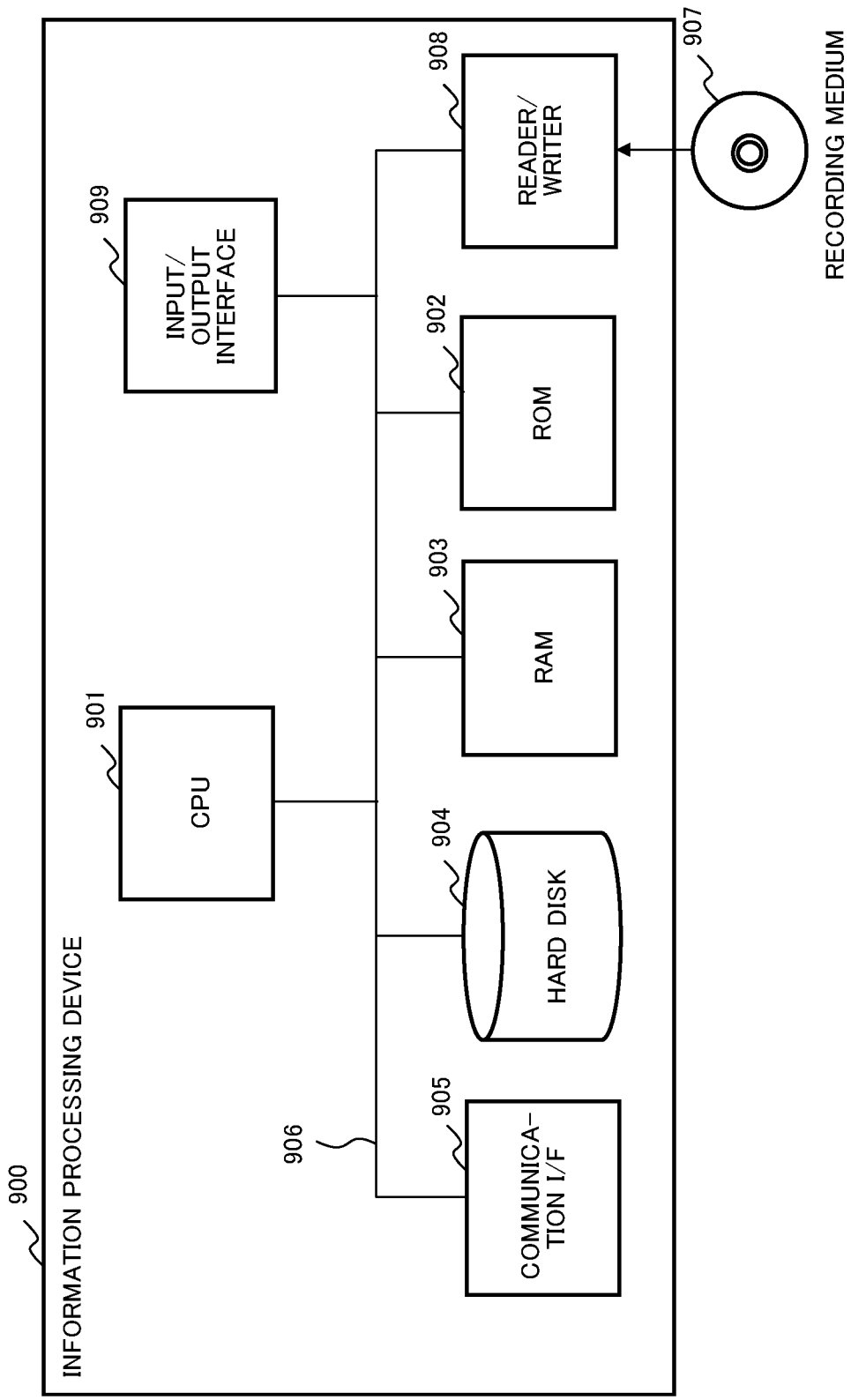

TERMINAL DEVICE, METHOD FOR CONTROL OF REPORT OF OPERATION INFORMATION PERFORMED BY TERMINAL DEVICE, AND RECORDING MEDIUM STORING THEREIN PROGRAM FOR CONTROL OF REPORT OF OPERATION INFORMATION PERFORMED BY TERMINAL DEVICE

This application is a National Stage of International Application No. PCT/JP2017/032134 filed Sep. 6, 2017 and the disclosures of which are incorporated herein in their entirety by reference.

TECHNICAL FIELD

The invention of the present application relates to a technique of controlling reporting, to a server device for administering occurrence of an illicit operation, information indicating an operation by a terminal device.

BACKGROUND ART

In cloud computing and the like, centralizedly administering various pieces of data transmitted from many endpoint-side terminal devices by a cloud-side server device has been generally performed. In this case, as the number of terminal devices increases, an amount of information being transmitted to the server device becomes enormous. Therefore, an expectation for a technique of efficiently reducing the information amount has been increased.

As a technique associated with such a technique, PTL 1 discloses a data collection administration system for enhancing utilization efficiency of a resource in the data collection administration system of administering data collected from a terminal. The data collection administration system includes a terminal for transmitting measurement data, and an administration device for receiving and administering the measurement data to be transmitted by the terminal. The administration device includes a notification unit for notifying the terminal of transmission cost information indicating a cost when the terminal transmits the measurement data to the administration device. Further, the terminal includes a computation unit for computing an information value indicating a value of measurement data as information, and a transmission control unit for determining whether to transmit the measurement data to the administration device, based on the information value and the transmission cost information.

CITATION LIST

Patent Literature

[PTL 1] International Publication No. WO2014/157240

SUMMARY OF INVENTION

Technical Problem

In a situation in which various types of new malware are generated on a daily basis, a cloud-side server device centralizedly administers an operation by a terminal device, and performs processing of detecting a terminal device that performs an illicit operation by malware and the like. In this case, first, it is required to securely capture an illicit operation by a terminal device without omission. Further, as the number of terminal devices being an administration target increases, an amount of information (operation information) indicating an operation of the terminal device, being transmitted to the server device, becomes enormous. Therefore, it is also required to reduce the amount of operation information being transmitted to the server device. Specifically, retaining securely capturing an illicit operation by a terminal device, and efficiently reducing operation information being transmitted from the terminal device to the server device are issues. PTL 1 fails to mention these issues. A main object of the invention of the present application is to provide a terminal device and the like for solving these issues.

Solution to Problem

A terminal device according to one aspect of the invention of the present application includes:

abstraction means for generating abstracted operation information acquired by abstracting operation information indicating a result of operation of the terminal device, based on an abstraction rule;

computation means for computing, based on the abstracted operation information, a forecast score indicating a level of forecast possibility relating to the operation information; and determination means for determining, based on the forecast score, whether to transmit the operation information to a detection device detecting that the terminal device operates in an illicit manner.

In another aspect for achieving the above-described object, a report control method for operation information by the terminal device according to one aspect of the invention of the present application includes:

by a terminal device being an information processing device, generating abstracted operation information acquired by abstracting operation information indicating a result of operation of the terminal device, based on an abstraction rule;

computing, based on the abstracted operation information, a forecast score indicating a level of forecast possibility relating to the operation information; and determining, based on the forecast score, whether to transmit the operation information to a detection device detecting that the terminal device operates in an illicit manner.

Also, in yet another aspect for achieving the above-described object, a report control program for operation information by the terminal device according to one aspect of the invention of the present application causes the terminal device being an information processing device to execute:

abstraction processing of generating abstracted operation information acquired by abstracting operation information indicating a result of operation of the terminal device, based on an abstraction rule;

computation processing of computing, based on the abstracted operation information, a forecast score indicating a level of forecast possibility relating to the operation information; and determination processing of determining, based on the forecast score, whether to transmit the operation information to a detection device detecting that the terminal device operates in an illicit manner.

Further, the invention of the present application is also achievable by a computer-readable non-volatile recording medium storing the report control program (computer program) for operation information by the terminal device.

Advantageous Effects of Invention

The invention of the present application is able to, when a server device detects an illicit operation by a terminal device, retain securely capturing the illicit operation by the terminal device, and efficiently reduce operation information being transmitted from the terminal device to the server device.

BRIEF DESCRIPTION OF DRAWINGS

FIG. 2 is a diagram exemplifying a content of operation information 150 according to the first example embodiment of the invention of the present application.

FIG. 3 is a diagram exemplifying a configuration of an abstraction rule 140 according to the first example embodiment of the invention of the present application.

FIG. 4 is a diagram exemplifying a content of abstracted operation information 110 according to the first example embodiment of the invention of the present application.

FIG. 5 is a diagram exemplifying a configuration of history information 141 according to the first example embodiment of the invention of the present application.

FIG. 6 is a diagram illustrating one example of a transmission probability to be acquired by a determination unit 13 according to the first example embodiment of the invention of the present application.

FIG. 8 is a block diagram illustrating a configuration of a terminal device 30 according to a second example embodiment of the invention of the present application.

FIG. 9 is a block diagram illustrating a configuration of an information processing device 900 being capable of achieving a terminal device according to each of the example embodiments of the invention of the present application.

EXAMPLE EMBODIMENT

Hereinafter, example embodiments according to the invention of the present application are described in detail with reference to the drawings. The invention of the present application is an invention, as described below, focusing on a point that there is a difference in operation tendency between a case that a terminal device operates in a normal manner, and a case that the terminal device operates in an illicit manner. Specifically, when the terminal device operates in a normal manner according to a predetermined program (process), there is a tendency that the terminal device performs an operation that has occurred a plurality of times in the past (specifically, an operation of a high forecast possibility). On the other hand, when the terminal device operates in an illicit manner by being infected with malware, there is a tendency that the terminal device unexpectedly performs an operation that has hardly occurred in the past (namely, an operation of a low forecast possibility). The present inventor has found the invention of the present application on the basis of such findings. In the following, the invention of the present application is described by a specific example.

First Example Embodiment

Figure 1:
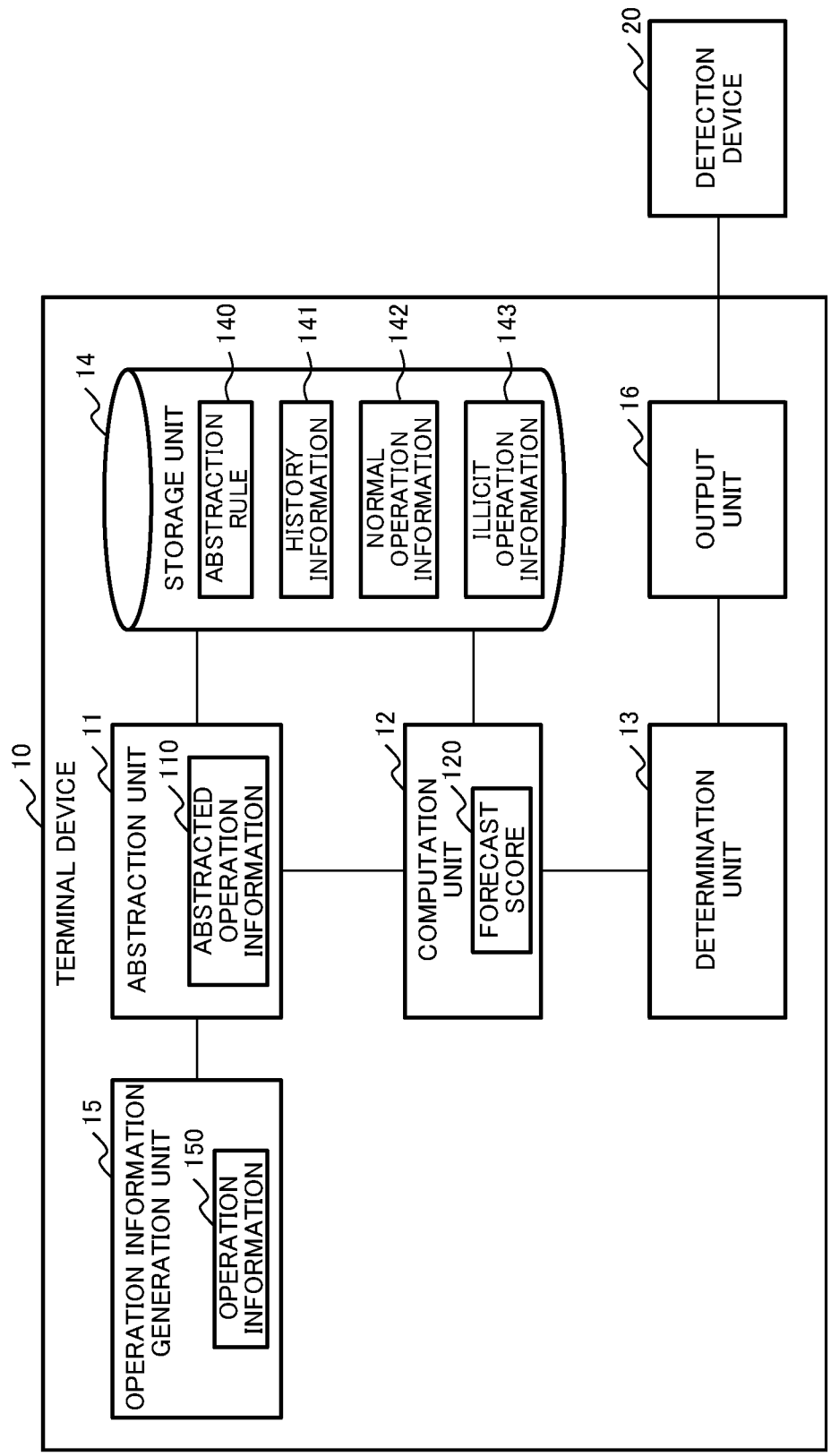
FIG. 1 is a block diagram illustrating a configuration of a terminal device 10 according to a first example embodiment of the invention of the present application.

FIG. 1 is a block diagram conceptually illustrating a configuration of a terminal device 10 according to a first example embodiment of the invention of the present application. The terminal device 10 is, for example, an information processing device such as a personal computer or a smartphone. Further, the terminal device 10 has a function of controlling to transmit, to a detection device 20 communicably connected via a communication network, information (operation information) indicating an operation of an own device.

The detection device 20 is an information processing device such as a server device for administering occurrence of an illicit operation (suspicious operation) by the terminal device 10, and is installed, for example, on a cloud side in cloud computing. Note that, for convenience of description, FIG. 1 illustrates one terminal device 10. Generally, however, a system configuration is such that many terminal devices 10 are communicably connected to the detection device 20. The present example embodiment also includes such a system configuration within the scope of the present example embodiment.

The terminal device 10 according to the present example embodiment includes an abstraction unit 11, a computation unit 12, a determination unit 13, a storage unit 14, an operation information generation unit 15, and an output unit 16.

The storage unit 14 is, for example, a storage device such as a magnetic disk or an electronic memory. The storage unit 14 stores an abstraction rule 140, history information 141, normal operation information 142, and illicit operation information 143. Details of the abstraction rule 140, the history information 141, the normal operation information 142, and the illicit operation information 143 will be described later.

The operation information generation unit 15 generates the operation information 150 indicating an operation by the terminal device 10 (an event that has occurred in the terminal device 10). Specifically, the operation information 150 is, for example, an operation log relating to the terminal device 10.

FIG. 2 is a diagram exemplifying a content of the operation information 150 according to the present example embodiment. FIG. 2 illustrates the operation information 150 generated by the operation information generation unit 15 regarding each of operations in an order in which the terminal device 10 has operated. Specifically, each row in FIG. 2 indicates an individual piece of the operation information 150.

For example, the operation information 150 indicating a first operation exemplified in FIG. 2 indicates that "type" is "process", "mode" is "start", "path" is "¥temp¥abcde.exe", and "pid" is "1234". This means that the first operation is an operation in which execution of a process (program) called "¥temp¥abcde.exe" has started. However, "¥" is a code indicating a hierarchical structure of a file. Note that there is a case that "\" is used, as the code indicating the hierarchical structure. Further, "pid" is an identifier being capable of identifying a process (program) (regarding a second operation and thereafter, similarly as described above).

For example, the operation information 150 indicating the second operation exemplified in FIG. 2 indicates that "type" is "registry", "mode" is "set-value", "key" is "HKCU¥software¥key1", and "value is "1". This means that the second operation is an operation in which a value "1" is set with respect to a registry called "HKCU¥software¥key1". Likewise, the operation information 150 indicating a third operation exemplified in FIG. 2 indicates that the third operation is an operation in which a value "2" is set with respect to the registry called "HKCU¥software¥key2".

The operation information 150 indicating fourth, seventh, and eighth operations exemplified in FIG. 2 indicate an access content to a file. The operation information 150 indicating fifth and sixth operations exemplified in FIG. 2 indicate an access content to a communication network. The operation information 150 indicating a ninth operation exemplified in FIG. 2 indicates that execution of a process called "¥temp¥abcde.exe", execution of which has started by the above-described first operation has ended.

The operation information generation unit 15 inputs the generated operation information 150 to the abstraction unit 11 illustrated in FIG. 1.

The abstraction unit 11 abstracts (simplifies) the operation information 150 input from the operation information generation unit 15, based on the abstraction rule 140 stored in the storage unit 14, and generates the abstracted operation information 110 indicating a result of abstraction.

FIG. 3 is a diagram conceptually exemplifying a configuration of the abstraction rule 140 according to the present example embodiment. As exemplified in FIG. 3, the abstraction rule 140 is an abstraction rule indicating a content of abstraction processing with respect to the operation information 150, for each value of "type" (type) included in the above-described operation information 150. Note that, for convenience of description, the abstraction rule illustrated in FIG. 3 is written in a text. Actually, however, it is assumed that the abstraction rule is written in a programming language and the like, for example.

The abstraction unit 11 performs the following abstraction processing with respect to the operation information 150 indicating that "type" is "process" in accordance with the abstraction rule 140 exemplified in FIG. 3.

A content of "type" and "mode" is retained (specifically, abstraction is not performed).

"Path" is abstracted until depth "1" (specifically, information indicating a hierarchical layer of a depth deeper than depth "1" is deleted).

FIG. 4 is a diagram exemplifying a content of the abstracted operation information 110 indicating a result acquired by abstracting the operation information 150 exemplified in FIG. 2 in accordance with the abstraction rule 140 exemplified in FIG. 3 by the abstraction unit 11. As exemplified in FIGS. 2 and 4, the abstraction unit 11 retains a content of "type" and "mode" with respect to the operation information 150 indicating the first and ninth operations, and deletes information indicating a hierarchical layer of a depth deeper than "¥temp" regarding "path". Further, the abstraction unit 11 deletes an item whose rule is not written in the abstraction rule 140. Therefore, the abstraction unit 11 deletes "pid:1234", which is included in the operation information 150 indicating the first and ninth operations (regarding the second to eighth operations, similarly as described above).

The abstraction unit 11 performs the following abstraction processing with respect to the operation information 150 indicating that "type" is "registry" in accordance with the abstraction rule 140 exemplified in FIG. 3.

A content of "type" and "mode" is retained (specifically, abstraction is not performed).

"Key" is abstracted until depth "2".

Therefore, as exemplified in FIGS. 2 and 4, the abstraction unit 11 retains a content of "type" and "mode" with respect to the operation information 150 indicating the second and third operations, and deletes information indicating a hierarchical layer of a depth deeper than "HKCU-⌊software" regarding "key". As described above, since the abstraction unit 11 deletes an item whose rule is not written in the abstraction rule 140, the abstraction unit 11 deletes "value 1", "value 2", and "pid:1234", which are included in the operation information 150 indicating the second and third operations.

The abstraction unit 11 performs the following abstraction processing with respect to the operation information 150 indicating that "type" is "file" in accordance with the abstraction rule 140 exemplified in FIG. 3.

A content of "type" and "mode" is retained (specifically, abstraction is not performed).

When "mode" is "write" or "remove", "path" is abstracted until depth "3", and when "mode" is "read", "path" is abstracted until depth "2".

When "mode" is "write" or "remove", an extension included in "path" is extracted as an item "ext".

Therefore, as exemplified in FIGS. 2 and 4, the abstraction unit 11 retains a content of "type" and "mode" with respect to the operation information 150 indicating the fourth operation, and deletes information indicating a hierarchical layer of a depth deeper than "¥program files¥A" regarding "path". Further, the abstraction unit 11 retains a content of "type" and "mode" with respect to the operation information 150 indicating the seventh and eighth operations, deletes information indicating a hierarchical layer of a depth deeper than "¥program files¥A¥B" regarding "path", and extracts an extension "dat" included in "path" as an item "ext".

As described above, the abstraction unit 11 performs abstraction such that a degree of abstraction (granularity of abstraction) is different with respect to operations whose operation types to be classified by combination of "type" and "mode" are different. More specifically, the abstraction rule 140 is such that a degree of abstraction is lowered (granularity of abstraction is made finer), as an influence of an operation type increases (importance in detection of an illicit operation increases), when the terminal device 10 has operated in an illicit manner.

For example, when an illicit reading operation has occurred, an influence thereof is limited to the reading operation. On the other hand, when an illicit writing operation has occurred, an influence thereof affects all reading operations of reading information (such as a file) written by the writing operation thereafter. Specifically, an influence of the writing operation in a case that the terminal device 10 has operated in an illicit manner is large, as compared with the reading operation. In this case, as described above, the abstraction rule 140 indicates that a reading operation with respect to a file is abstracted until depth "2", and abstraction of a writing operation with respect to a file is performed until depth "3" being a deeper level.

The abstraction unit 11 performs the following abstraction processing with respect to the operation information 150 indicating that "type" is "network" in accordance with the abstraction rule 140 exemplified in FIG. 3.

A content of "type" and "mode" is retained (specifically, abstraction is not performed).

Therefore, as exemplified in FIGS. 2 and 4, the abstraction unit 11 retains a content of "type" and "mode" with respect to the operation information 150 indicating the fifth and sixth operations. Further, similarly to the operation of deleting "value 1" and "value 2" with respect to the operation information 150 indicating the above-described second and third operations, the abstraction unit 11 deletes an item whose rule is not written in the abstraction rule 140. Therefore, the abstraction unit 11 deletes "host:example.com, ip:192.168.0.1", "host:example.com, headers: . . . ", and "pid:1234", which are included in the operation information 150 indicating the fifth and sixth operations.

The abstraction unit 11 inputs the generated abstracted operation information 110 to the computation unit 12.

The computation unit 12 computes a forecast score 120 indicating a level of forecast possibility relating to the operation information 150, based on the abstracted operation information 110 input from the abstraction unit 11. Specifically, the computation unit 12 computes the forecast score 120, for each piece of the operation information 150 indicating an individual row in FIG. 2. At this occasion, the computation unit 12 computes the number of times of occurrence or a frequency of occurrence in the terminal device 10, for example, for each piece of the abstracted operation information 110 in which a content is similar, and computes the forecast score 120 relating to an operation indicated by the abstracted operation information 110 high, as the number of times of occurrence or a frequency of occurrence of the operation in the past increases.

The computation unit 12 administers the number of times of occurrence or a frequency of occurrence, for each piece of the abstracted operation information 110 in which a content is similar, by using the history information 141 stored in the storage unit 14. The computation unit 12 collates the abstracted operation information 110 input from the abstraction unit 11, with the history information 141 stored in the storage unit 14. When the abstracted operation information 110 input from the abstraction unit 11 is registered in the history information 141, the computation unit 12 increments the number of times of occurrence or a frequency of occurrence relating to the abstracted operation information 110 by "1". When the abstracted operation information 110 input from the abstraction unit 11 is not registered in the history information 141, the computation unit 12 newly registers the abstracted operation information 110 in the history information 141, and sets the number of times of occurrence or a frequency of occurrence relating to the abstracted operation information 110 to "1".

FIG. 5 is a diagram conceptually exemplifying a configuration of the history information 141 according to the present example embodiment. The history information 141 exemplified in FIG. 5 is information indicating the number of times of occurrence or a frequency of an operation that has occurred in the past in the terminal device 10, for each type (operation type) of an abstracted operation content, which is indicated by the abstracted operation information 110 exemplified in FIG. 4. The computation unit 12 may set the number of times of occurrence or a frequency of occurrence included in the history information 141, as a target value throughout all periods until a current time, or as a target value in a predetermined period in the past.

The computation unit 12 may administer the history information 141, for each program (process) to be executed by the terminal device 10 (specifically, in association with the program). In this case, the computation unit 12 is able to use, as an identifier being capable of identifying a program, for example, a name of the program, or a hash value (e.g., a message digest algorithm 5 (MD5) hash value) and the like to be acquired by using a predetermined hash function with respect to the program.

The computation unit 12 computes the forecast score 120 high, as the number of times of occurrence or a frequency of occurrence increases, based on the number of times of occurrence or a frequency of occurrence indicated by the history information 141. For example, the computation unit 12 may set the number of times of occurrence or a frequency of occurrence indicated by the history information 141 as it is, as the forecast score 120. The computation unit 12 inputs the computed forecast score 120 to the determination unit 13.

Further, when the abstracted operation information 110 indicates a specific content, the computation unit 12 may detect whether the abstracted operation information 110 is the specific content in such a way that the terminal device 10 can control transmission of the operation information 150 to the detection device 20 without depending on the forecast score 120. In this case, the computation unit 12 collates the abstracted operation information 110 input from the abstraction unit 11, with the normal operation information 142 and the illicit operation information 143 stored in the storage unit 14.

The normal operation information 142 is information in which a content of the abstracted operation information 110 clarifying that the operation is a normal operation is registered by an administrator and the like of the terminal device 10, for example. The normal operation information 142 is information generatable in advance by an administrator and the like, based on a content and the like of a program to be executed by the terminal device 10. As an operation indicated by the normal operation information 142, for example, there is an access operation to a file of a predetermined format, which is stored in a predetermined folder (storage area), and the like.

The illicit operation information 143 is information in which a content of the abstracted operation information 110 clarifying that the operation is an illicit operation is registered by an administrator and the like of the terminal device 10, for example. The illicit operation information 143 is information generatable in advance by an administrator and the like, based on information and the like indicating a known malware operation. As an operation indicated by the illicit operation information 143, for example, there are an operation of registering an execution file and the like in a startup, an operation of generating an execution file, an operation of communicating to a specific communication destination, and the like.

The computation unit 12 inputs, to the determination unit 13, a result of detection that the abstracted operation information 110 input from the abstraction unit 11 is similar to the normal operation information 142 or the illicit operation information 143. Herein, an expression "the abstracted operation information 110 is similar to the normal operation information 142 or the illicit operation information 143" means, for example, the abstracted operation information 110 coincides with the normal operation information 142 or the illicit operation information 143. Alternatively, the expression "the abstracted operation information 110 is similar to the normal operation information 142 or the illicit operation information 143" may mean that a degree of similarity between the abstracted operation information 110, and the normal operation information 142 or the illicit operation information 143 satisfies a criterion. Specifically, it is assumed that two pieces of information are similar to each other means that the two pieces of information coincide with each other or are analogous to each other. Since a known technique is applicable to detection as to whether the two pieces of information coincide with each other, or a degree of similarity between the two pieces of information satisfies the criterion, detailed description thereof is omitted.

The determination unit 13 determines whether to transmit the operation information 150 to the detection device 20, based on the forecast score 120 input from the computation unit 12. At this occasion, after acquiring a probability with which the operation information 150 is transmitted to the detection device 20, based on the forecast score 120, the determination unit 13 may determine whether to transmit the operation information 150 to the detection device 20 by using the acquired transmission probability.

FIG. 6 is a diagram illustrating one example of a transmission probability to be acquired by the determination unit 13 according to the present example embodiment. As illustrated in FIG. 6, the determination unit 13 acquires the transmission probability in such a way that the transmission probability is lowered, as the forecast score 120 increases. For example, when the transmission probability relating to a certain piece of abstracted operation information 110 is "0.3", the determination unit 13 determines that the operation information 150 relating to the certain piece of abstracted operation information 110 is transmitted to the detection device 20 three times out of ten.

Further, the determination unit 13 may not have to acquire a transmission probability with respect to a forecast score, as a value that sequentially changes, as exemplified in FIG. 6. For example, the determination unit 13 may perform simplified determination such that, when the forecast score is equal to or larger than a threshold value, the determination unit 13 sets the transmission probability to "0", and when the forecast score is smaller than the threshold value, the determination unit 13 sets the transmission probability to "1".

When a detection result indicating that the abstracted operation information 110 is similar to the normal operation information 142 is input from the computation unit 12, the determination unit 13 determines not to transmit the operation information 150 relating to the abstracted operation information 110 to the detection device 20. When a detection result indicating that the abstracted operation information 110 is similar to the illicit operation information 143 is input from the computation unit 12, the determination unit 13 determines to transmit the operation information 150 relating to the abstracted operation information 110 to the detection device 20.

The determination unit 13 inputs, to the output unit 16, a determination result as to whether to transmit the operation information 150 to the detection device 20.

When the determination result input from the determination unit 13 indicates that the operation information 150 is transmitted to the detection device 20, the output unit 16 transmits the operation information 150 to the detection device 20. At this occasion, the output unit 16 may transmit, to the detection device 20, the forecast score 120 relating to the operation information 150 altogether. In this case, since a level of forecast possibility relating to the operation information 150 can be captured on the side of the detection device 20, an illicit operation by the terminal device 10 can be easily detected.

Figure 7:
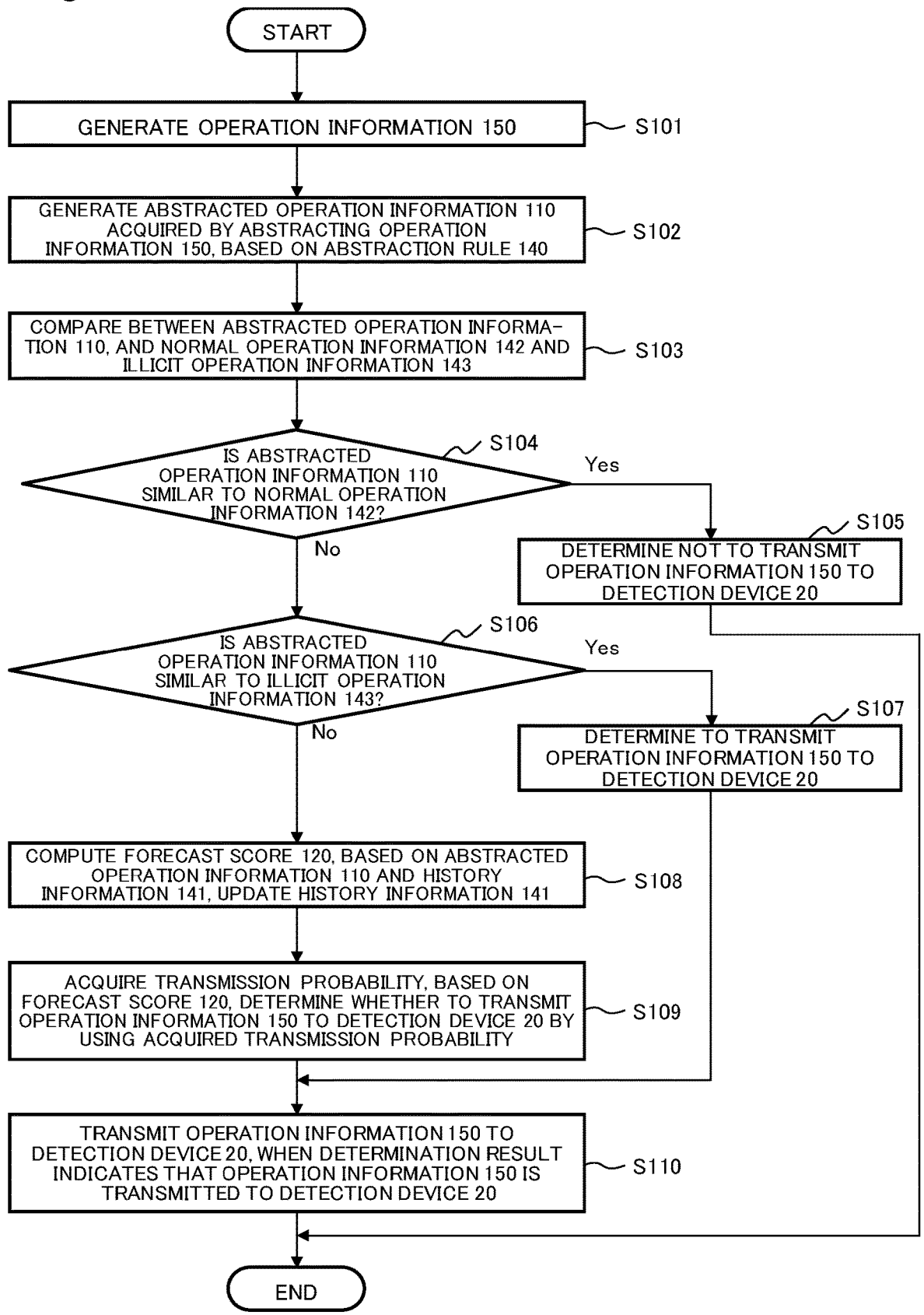
FIG. 7 is a flowchart illustrating an operation of the terminal device 10 according to the first example embodiment of the invention of the present application.

Next, an operation (processing) of the terminal device 10 according to the present example embodiment is described in detail with reference to the flowchart of FIG. 7.

The operation information generation unit 15 generates the operation information 150 (Step S101). The abstraction unit 11 generates the abstracted operation information 110 acquired by abstracting the operation information 150, based on the abstraction rule 140 (Step S102). The computation unit 12 compares between the abstracted operation information 110, and the normal operation information 142 and the illicit operation information 143 (Step S103).

When the abstracted operation information 110 is similar to the normal operation information 142 (Yes in Step S104), the determination unit 13 determines not to transmit the operation information 150 to the detection unit 20 (Step S105), and the entire processing ends. When the abstracted operation information 110 is not similar to the normal operation information 142 (No in Step S104), the processing proceeds to Step S106.

When the abstracted operation information 110 is similar to the illicit operation information 143 (Yes in Step S106), the determination unit 13 determines to transmit the operation information 150 to the detection device 20 (Step S107), and the processing proceeds to Step S110. When the abstracted operation information 110 is not similar to the illicit operation information 143 (No in Step S106), the processing proceeds to Step S108.

The computation unit 12 computes the forecast score 120, based on the abstracted operation information 110 and the history information 141, and updates the history information 141 (Step S108). The determination unit 13 acquires a transmission probability, based on the forecast score 12, and determines whether to transmit the operation information 150 to the detection unit 20 by using the transmission probability (Step S109). When the determination result by the determination unit 13 indicates that the operation information 150 is transmitted to the detection device 20, the output unit 16 transmits the operation information 150 to the detection device 20 (Step S110), and the entire processing ends.

The terminal device 10 according to the present example embodiment is able to, when a server device detects an illicit operation by a terminal device, retain securely capturing the illicit operation by the terminal device, and efficiently reduce operation information being transmitted from the terminal device to the server device. A reason for this is that the terminal device 10 generates the abstracted operation information 110 acquired by abstracting the operation information 150, computes the forecast score 120, based on the abstracted operation information 110, and determines whether to transmit the operation information 150 to the detection device 20 (server device), based on the forecast score 120.

In the following, an advantageous effect to be achieved by the terminal device 10 according to the present example embodiment is described in detail.

When a cloud-side server device detects an illicit operation by a terminal device and the like infected with malware by centralized administration, first, it is required to securely capture the illicit operation by the terminal device without fail. Further, as the number of terminal devices being an administration target increases, an amount of operation information being transmitted from the terminal device to the server device becomes enormous. Therefore, it is also required to reduce the amount of operation information being transmitted to the server device. Specifically, retaining securely capturing the illicit operation by the terminal device, and efficiently reducing operation information being transmitted from the terminal device to the server device are tasks.

Regarding such tasks, the terminal device 10 according to the present example embodiment utilizes a tendency such that, when operating in a normal manner according to a predetermined program, the terminal device 10 performs an operation of a high forecast possibility, and, when operating in an illicit manner by being infected with malware, the terminal device 10 performs an operation of a low forecast possibility. Herein, a level of forecast possibility (forecast score) relating to an operation is, for example, a value to be acquired based on an operation history in the past relating to the terminal device 10. However, since individual operations are generally different from one another regarding a detailed portion (e.g. a name of a file to be accessed, and the like), a configuration being capable of determining whether mutual operations are inherently (approximately) similar to one another is required in order to efficiently acquire the forecast score.

In view of the above, the terminal device 10 according to the present example embodiment includes the abstraction unit 11, the computation unit 12, and the determination unit 13 in order to achieve the above-described configuration, and operates as described above with reference to FIGS. 1 to 7, for example. Specifically, the abstraction unit 11 generates the abstracted operation information 110 acquired by abstracting the operation information 150 indicating a result of operation of the terminal device 10, based on the abstraction rule 140. The computation unit 12 computes, based on the abstracted operation information 110, the forecast score 120 indicating a level of forecast possibility relating to the operation information 150. The determination unit 13 determines, based on the forecast score 120, whether to transmit the operation information 150 to the detection device 20 for detecting that the terminal device 10 has operated in an illicit manner. Thus, the terminal device 10 according to the present example embodiment is able to, when a server device detects an illicit operation by a terminal device, retain securely capturing the illicit operation by the terminal device, and efficiently reduce operation information being transmitted from the terminal device to the server device.

Further, the determination unit 13 according to the present example embodiment acquires a probability with which the operation information 150 is transmitted to the detection device 20, based on the forecast score 120, and determines whether to transmit the operation information 150 to the detection device 20 by using the probability. Thus, the terminal device 10 according to the present example embodiment is able to appropriately and efficiently reduce the operation information 150 being transmitted to the server device.

Further, the abstraction unit 11 according to the present example embodiment lowers a degree of abstraction in performing abstraction, as an influence of an operation of an operation type increases, when the terminal device 10 has operated in an illicit manner. Therefore, the abstraction rule 140 according to the present example embodiment indicates that a degree of abstraction with respect to a writing operation is lowered, as compared with a reading operation, for example. Alternatively, the abstraction rule 140 may indicate that a degree of abstraction with respect to an operation is lowered, as execution authority given to the operation is stronger (priority of an operation increases). Specifically, since the terminal device 10 according to the present example embodiment performs abstraction such that a degree of abstraction is different with respect to an operation whose operation type is different according to a magnitude of influence that affects when the terminal device 10 has operated in an illicit manner, it is possible to appropriately and efficiently reduce operation information being transmitted to the server device.

Further, the terminal device 10 according to the present example embodiment detects that the generated abstracted operation information 110 is similar to the normal operation information 142, and when the abstracted operation information 110 is similar to the normal operation information 142, the terminal device 10 determines not to transmit the operation information 150 to the detection device 20. Therefore, when it is clear that an operation indicated by the abstracted operation information 110 is a normal operation, the terminal device 10 does not transmit the operation information 150, not to mention computation of the forecast score 120. Thus, it is possible to more efficiently reduce operation information being transmitted to the server device.

Further, for example, let us consider a case that a program to be executed by the terminal device 10 regularly performs an operation, which is generally supposed to be performed by malware (e.g., an operation of registering an execution file and the like in a startup function, and an operation of generating an execution file, which are included in an operating system (OS) such as the Windows (registered trademark)), and the program is infected with malware. In this case, the malware performs code injection (operation takeover), and then, executes an operation similar to a regular operation of the program. At this occasion, the computation unit 12 computes the forecast score 120 relating to an illicit operation by the malware high. Therefore, in this case, there is a problem that the terminal device 10 may erroneously refrain from transmitting the operation information 150 to the detection device 20, regardless that the operation is the illicit operation by malware.

Regarding such a problem, the terminal device 10 according to the present example embodiment administers the forecast score 120 in association with a program to be executed. Further, the terminal device 10 detects that the generated abstracted operation information 110 is similar to the illicit operation information 143, and when the abstracted operation information 110 is similar to the illicit operation information 143, the terminal device 10 transmits the operation information 150 to the detection device 20, regardless of the forecast score 120. Thus, the terminal device 10 according to the present example embodiment is able to avoid, when a program to be executed by the terminal device 10 regularly performs an operation, which is generally supposed to be performed by malware, the above-described operation of erroneously refraining from transmitting the operation information 150 indicating an illicit operation to the detection device 20.

Further, when information is compressed by employing a general information (data) compression algorithm, the computation unit 12 according to the present example embodiment may compute the forecast score 120 by using a feature that an amount of information acquired after compression decreases, as the information includes more pieces of partial information in which a content is similar (analogous). An operation of the computation unit 12 in this case is described.

It is assumed that a plurality of pieces of abstracted operation information 110 generated successively so far are $A(1)$ to $A(k)$ (where k is any integer of 2 or larger). However, it is assumed that $A(k)$ is the abstracted operation information 110 relating to the latest operation, which is a determination target as to whether to transmit the operation information 150 to the detection device 20; and $A(1)$ to $A(k-1)$ are the abstracted operation information 110 relating to an operation in the past.

Further, it is assumed that an amount of information acquired after performing information compression with respect to $A(1)$ to $A(k)$ altogether by employing a general information compression algorithm is $L(k)$. For example, when $A(1)$ to $A(k)$ are expressed by a character string, $L(k)$ indicates a length of a character string generated by connecting the character strings indicated by $A(k)$ to $A(k)$, and then, performing information compression with respect to the connected character strings.

In this case, "L(k)-L(k-1)" indicates an amount of information acquired after information compression, which increases by addition of A(k) to A(1) to A(k-1). Further, as a ratio with which A(k) is similar (analogous) to A(1) to A(k-1) increases, "L(k)-L(k-1)" decreases by the above-described feature on information compression. Specifically, the smaller "L(k)-L(k-1)" is, the higher the forecast score 120 relating to A(k) is.

Therefore, the computation unit 12 computes the forecast score 120, based on a magnitude of difference, by acquiring the magnitude of difference between an information amount of information generated by compression after collecting a plurality of pieces of abstracted operation information 110 generated successively so far, and an information amount of information generated by compression after collecting one or more pieces of the abstracted operation information 110 except for the latest piece of the abstracted operation information 110. Therefore, in this case, the terminal device 10 is able to compute the forecast score 120 without administering the number of times of occurrence or a frequency of occurrence for each operation.

Further, the computation unit 12 according to the present example embodiment may generate statistical information indicating a distribution relating to a magnitude of difference by computing an average and a variance regarding the magnitude of the plurality of differences acquired so far, when the forecast score 120 is computed as described above, and compute the forecast score 120, based on the statistical information. In this case, the computation unit 12 computes the forecast score 12 low, as a standard score (Z score) relating to the magnitude of difference increases. Thus, the terminal device 10 according to the present example embodiment is able to compute the forecast score 120 with high accuracy.

Note that, when the computation unit 12 computes the forecast score 120 by the above-described method, the computation unit 12 may not have to use, among a plurality of pieces of abstracted operation information 110 generated successively so far, the abstracted operation information 110 in which a predetermined time or longer has elapsed after generation.

Second Example Embodiment

FIG. 8 is a block diagram conceptually illustrating a configuration of a terminal device 30 according to a second example embodiment of the invention of the present application. The terminal device 30 includes an abstraction unit 31, a computation unit 32, and a determination unit 33.

The abstraction unit 31 generates an abstracted operation information 310 acquired by abstracting the operation information 350 indicating a result of operation of the terminal device 30, based on an abstraction rule 340.

The computation unit 32 computes a forecast score 320 indicating a level of forecast possibility relating to the operation information 350, based on the abstracted operation information 310.

The determination unit 33 determines, based on the forecast score 320, whether to transmit the operation information 350 to a detection device 40 for detecting that the terminal device 30 has operated in an illicit manner.

The terminal device 30 according to the present example embodiment is able to, when a server device detects an illicit operation by a terminal device, retain securely capturing the illicit operation by the terminal device, and efficiently reduce operation information being transmitted from the terminal device to the server device. A reason for this is that the terminal device 30 generates the abstracted operation information 310 acquired by abstracting the operation information 350, computes the forecast score 320, based on the abstracted operation information 310, and determines whether to transmit the operation information 350 to the detection device 40 (server device), based on the forecast score 320.

Hardware Configuration Example

Each unit in the terminal devices illustrated in FIGS. 1 and 8 in the above-described example embodiments can be achieved by a dedicated hardware (HW) (electronic circuit). Further, in FIGS. 1 and 8, at least the following components can be regarded as function (processing) units (software modules) of a software program.

The abstraction units 11 and 31,
the computation units 12 and 32,
the determination units 13 and 33,
a storage control function in the storage unit 14,
the operation information generation unit 15, and
the output unit 16.

However, a classification of the units illustrated in these drawings is a configuration for convenience of description. When the units are actually mounted, various configurations can be proposed. One example of a hardware environment in this case is described with reference to FIG. 9.

FIG. 9 is a diagram exemplarily illustrating a configuration of an information processing device 900 (computer) being capable of achieving a terminal device according to each of the example embodiments of the invention of the present application. Specifically, FIG. 9 illustrates a configuration of a computer (information processing device) being capable of achieving the terminal devices 10 and 30 illustrated in FIGS. 1 and 8, and a hardware environment being capable of achieving each of the functions in the above-described example embodiments.

The information processing device 900 illustrated in FIG. 9 includes the following as constituent elements.

A central processing unit (CPU) 901,
a read only memory (ROM) 902,
a random access memory (RAM) 903,
a hard disk (storage device) 904,
a communication interface 905 to an external device,
a bus 906 (communication line),
a reader/writer 908 being capable of reading and writing data stored in a recording medium 907 such as a compact disc read only memory (CD-ROM), and
an input/output interface 909.

Specifically, the information processing device 900 including the above-described constituent elements is a general computer in which these components are connected via the bus 906. The information processing device 900 may include a plurality of CPUs 901, or may include a CPU 901 configured by a multiple core.

Further, the invention of the present application described by the above-described example embodiments as an example supplies, to the information processing device 900 illustrated in FIG. 9, a computer program being capable of achieving the following function. The function is a function of the above-described configuration in the block configuration diagrams (FIGS. 1 and 8), or the flowchart (FIG. 7), which is referred to in describing the example embodiments. The invention of the present application, thereafter, is achieved by reading the computer program on the hardware CPU 901 for interpretation and execution. Further, the computer program supplied to the device may be stored in a readable and writable volatile memory (RAM 903), or a non-volatile storage device such as the ROM 902 and the hard disk 904.

Furthermore, in the above-described case, nowadays, a general procedure can be employed as a method of supplying the computer program to the hardware. The procedure is, for example, a method of installing the computer program in the device via various recording media 907 such as a CD-ROM, a method of downloading the computer program from an outside via a communication line such as the Internet, and the like. Further, in such a case, the invention of the present application can be regarded such that the invention is configured by codes constituting the computer program, or the recording medium 907 storing the codes.

In the foregoing, the invention of the present application has been described by using the above-described example embodiments as an exemplary example. The invention of the present application, however, is not limited to the above-described example embodiments. Specifically, the invention of the present application may include various aspects comprehensible to a person skilled in the art within the scope of the invention of the present application.

Note that a part or all of the above-described example embodiments may be described as the following supplementary notes. The invention of the present application exemplarily described by the above-described example embodiments, however, is not limited to the following.

(Supplementary Note 1)

A terminal device including:

abstraction means for generating abstracted operation information acquired by abstracting operation information indicating a result of operation of the terminal device, based on an abstraction rule;

computation means for computing, based on the abstracted operation information, a forecast score indicating a level of forecast possibility relating to the operation information; and determination means for determining, based on the forecast score, whether to transmit the operation information to a detection device detecting that the terminal device operates in an illicit manner.

(Supplementary Note 2)

The terminal device according to Supplementary note 1, wherein the computation means computes a number of times of occurrence or a frequency of occurrence, for each piece of the abstracted operation information in which a content is similar, and sets the forecast score higher, as the number of times of occurrence or the frequency of occurrence is higher.

(Supplementary Note 3)

The terminal device according to Supplementary note 2, wherein the computation means computes the number of times of occurrence or the frequency of occurrence in a predetermined period, and stores a computation result in storage means.

(Supplementary Note 4)

The terminal device according to Supplementary note 2 or 3, wherein the computation means computes the number of times of occurrence or the frequency of occurrence in association with a program to be executed by the terminal device.

(Supplementary Note 5)

The terminal device according to Supplementary note 4, wherein the computation means uses, as an identifier being capable of identifying the program, a name of the program, or a hash value based on the program.

(Supplementary Note 6)

The terminal device according to Supplementary note 1, wherein the computation means acquires a magnitude of difference between an information amount of information generated by compression after collecting a plurality of pieces of the abstracted operation information generated successively so far, and an information amount of information generated by compression after collecting one or more pieces of the abstracted operation information except for a latest piece of the abstracted operation information, and computes the forecast score, based on the magnitude of difference.

(Supplementary Note 7)

The terminal device according to Supplementary note 6, wherein the computation means generates statistical information indicating a distribution relating to the magnitude of difference by computing an average and a variance regarding a plurality of the magnitudes of difference acquired so far, and computes the forecast score, based on the statistical information.

(Supplementary Note 8)

The terminal device according to Supplementary note 1, wherein the computation means detects that the abstracted operation information generated by the abstraction means is similar to normal operation information registered in advance in storage means, and the determination means determines, when the computation means detects that the abstracted operation information is similar to the normal operation information, not to transmit the operation information to the detection device.

(Supplementary Note 9)

The terminal device according to Supplementary note 1, wherein the computation means detects that the abstracted operation information generated by the abstraction means is similar to illicit operation information registered in advance in storage means, and the determination means determines, when the computation means detects that the abstracted operation information is similar to the illicit operation information, to transmit the operation information to the detection device.

(Supplementary Note 10)

The terminal device according to any one of Supplementary notes 1 to 9, wherein the determination means acquires a probability that the operation information is transmitted to the detection device, based on the forecast score, and determines whether to transmit the operation information to the detection device by using the probability.

(Supplementary Note 11)

The terminal device according to any one of Supplementary notes 1 to 10, wherein the abstraction rule indicates abstraction in which a degree of abstraction is different with respect to an operation whose operation type is different.

(Supplementary Note 12)

The terminal device according to Supplementary note 11, wherein the abstraction rule indicates abstraction in which the degree of abstraction with respect to a reading operation is set higher than the degree of abstraction with respect to a writing operation.

(Supplementary Note 13)

The terminal device according to Supplementary note 11 or 12, wherein the abstraction rule indicates abstraction in which the degree of abstraction with respect to the operation is lower, as execution authority given to the operation is stronger.

(Supplementary Note 14)

The terminal device according to any one of Supplementary notes 1 to 13, further including output means for transmitting the operation information to the detection device, based on a determination result by the determination means.

(Supplementary Note 15)

The terminal device according to Supplementary note 14, wherein the output means transmits, to the detection device, the forecast score relating to the operation information.

(Supplementary Note 16)

A report control method for operation information by a terminal device, including:

by a terminal device being an information processing device, generating abstracted operation information acquired by abstracting operation information indicating a result of operation of the terminal device, based on an abstraction rule;

computing, based on the abstracted operation information, a forecast score indicating a level of forecast possibility relating to the operation information; and determining, based on the forecast score, whether to transmit the operation information to a detection device detecting that the terminal device operates in an illicit manner.

(Supplementary Note 17)

A recording medium storing a report control program for operation information by a terminal device for causing the terminal device being an information processing device to execute:

abstraction processing of generating abstracted operation information acquired by abstracting operation information indicating a result of operation of the terminal device, based on an abstraction rule;

computation processing of computing, based on the abstracted operation information, a forecast score indicating a level of forecast possibility relating to the operation information; and determination processing of determining, based on the forecast score, whether to transmit the operation information to a detection device detecting that the terminal device operates in an illicit manner.

REFERENCE SIGNS LIST

10 Terminal device
11 Abstraction unit
110 Abstracted operation information
12 Computation unit
120 Forecast score
13 Determination unit
14 Storage unit
140 Abstraction rule
141 History information
142 Normal operation information
143 Illicit operation information
15 Operation information generation unit
150 Operation information
16 Output unit
20 Detection device
30 Terminal device
31 Abstraction unit
310 Abstracted operation information
32 Computation unit
320 Forecast score
340 Abstraction rule
350 Operation information
40 Detection device
900 Information processing device
901 CPU
902 ROM
903 RAM
904 Hard disk (storage device)
905 Communication interface
906 Bus
907 Recording medium
908 Reader/writer
909 Input/output interface

The invention claimed is:

1. A terminal device comprising:
at least one memory storing a first computer program; and
at least one processor configured to execute the computer program to:
generate abstracted operation information acquired by abstracting actual operation information indicating a result of operation of the terminal device, based on an abstraction rule;
compute, based on the generated abstracted operation information, a forecast score indicating a level of forecast possibility relating to the actual operation information; and
determine, based on the forecast score, whether to transmit the actual operation information to a detection device detecting that the terminal device operates in an illicit manner, wherein
the abstraction rule indicates
abstraction in which the degree of abstraction with respect to a reading operation is set higher than the degree of abstraction with respect to a writing operation, and/or
abstraction in which the degree of abstraction with respect to the operation is lowered, as a priority of the operation increases.

2. The terminal device according to claim 1, wherein the processor is configured to execute the first computer program to:
compute a number of times of occurrence or a frequency of occurrence, for each piece of the generated abstracted operation information in which a content is similar, and sets the forecast score higher, as the number of times of occurrence or the frequency of occurrence is higher.

3. The terminal device according to claim 2, wherein the processor is configured to execute the first computer program to:
compute the number of times of occurrence or the frequency of occurrence in a predetermined period, and store a computation result in storage means.

4. The terminal device according to claim 2, wherein the processor is configured to execute the first computer program to:
compute the number of times of occurrence or the frequency of occurrence in association with a second computer program to be executed by the terminal device.

5. The terminal device according to claim 4, wherein the processor is configured to execute the first computer program to:
use, as an identifier being capable of identifying the second computer program, a name of the program, or a hash value based on the second computer program.

6. The terminal device according to claim 1, wherein the processor is configured to execute the first computer program to:
acquire a magnitude of difference between an information amount of information generated by compression after collecting a plurality of pieces of the generated abstracted operation information generated successively so far, and an information amount of information generated by compression after collecting one or more pieces of the generated abstracted operation information except for a latest piece of the generated abstracted operation information, and compute the forecast score, based on the magnitude of difference.

7. The terminal device according to claim 6, wherein the processor is configured to execute the first computer program to:
generate statistical information indicating a distribution relating to the magnitude of difference by computing an average and a variance regarding a plurality of the magnitudes of difference acquired so far, and compute the forecast score, based on the statistical information.

8. The terminal device according to claim 1, wherein the processor is configured to execute the first computer program to:
detect that the generated abstracted operation information is similar to normal operation information registered in advance in storage means, and
determine, when detecting that the generated abstracted operation information is similar to the normal operation information, not to transmit the actual operation information to the detection device.

9. The terminal device according to claim 1, wherein the processor is configured to execute the first computer program to:
detect that the generated abstracted operation information is similar to illicit operation information registered in advance in storage means, and
determine, when detecting that the generated abstracted operation information is similar to the illicit operation information, to transmit the actual operation information to the detection device.

10. The terminal device according to claim 1, wherein the processor is configured to execute the first computer program to:
acquire a probability that the actual operation information is transmitted to the detection device, based on the forecast score, and determine whether to transmit the actual operation information to the detection device by using the probability.

11. The terminal device according to claim 1, wherein the processor is configured to execute the first computer program to:
transmit the actual operation information to the detection device, based on a determination result whether to transmit the actual operation information to a detection device.

12. The terminal device according to claim 11, wherein the processor is configured to execute the first computer program to:
transmit, to the detection device, the forecast score relating to the actual operation information.

13. A report control method for operation information by a terminal device, comprising:
by the terminal device being an information processing device,
generating abstracted operation information acquired by abstracting actual operation information indicating a result of operation of the terminal device, based on an abstraction rule;
computing, based on the generated abstracted operation information, a forecast score indicating a level of forecast possibility relating to the actual operation information; and
determining, based on the forecast score, whether to transmit the actual operation information to a detection device detecting that the terminal device operates in an illicit manner, wherein
the abstraction rule indicates
abstraction in which the degree of abstraction with respect to a reading operation is set higher than the degree of abstraction with respect to a writing operation, and/or
abstraction in which the degree of abstraction with respect to the operation is lowered, as a priority of the operation increases.

14. A non-transitory computer-readable recording medium storing a report control program for operation information by a terminal device for causing the terminal device being an information processing device to execute:
generating abstracted operation information acquired by abstracting operation information indicating a result of operation of the terminal device, based on an abstraction rule;
computing, based on the generated abstracted operation information, a forecast score indicating a level of forecast possibility relating to the actual operation information; and
determining, based on the forecast score, whether to transmit the actual operation information to a detection device detecting that the terminal device operates in an illicit manner, wherein
the abstraction rule indicates
abstraction in which the degree of abstraction with respect to a reading operation is set higher than the degree of abstraction with respect to a writing operation, and/or
abstraction in which the degree of abstraction with respect to the operation is lowered, as a priority of the operation increases.

* * * * *